United States Patent
Hansman, Jr. et al.

(10) Patent No.: US 12,072,717 B2
(45) Date of Patent: *Aug. 27, 2024

(54) SYSTEM AND METHOD FOR CONTROLLING DIFFERENTIAL THRUST OF A BLOWN LIFT AIRCRAFT

(71) Applicant: Electra Aero, Inc., Manassas, VA (US)

(72) Inventors: Robert John Hansman, Jr., Cambridge, MA (US); Christopher B. Courtin, Fairfax Station, VA (US); Oliver Masefield, Stans (CH)

(73) Assignee: Electra Aero, Inc., Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,416

(22) Filed: Oct. 25, 2023

(65) Prior Publication Data

US 2024/0085926 A1  Mar. 14, 2024

Related U.S. Application Data

(63) Continuation of application No. 18/114,828, filed on Feb. 27, 2023, now Pat. No. 11,846,953.

(60) Provisional application No. 63/315,203, filed on Mar. 1, 2022.

(51) Int. Cl.
*G05D 1/00* (2024.01)
*B64C 13/16* (2006.01)
*B64D 31/10* (2006.01)

(52) U.S. Cl.
CPC ........... *G05D 1/0825* (2013.01); *B64C 13/16* (2013.01); *B64D 31/10* (2013.01)

(58) Field of Classification Search
CPC ........ G05D 1/0825; G05D 1/00; B64C 13/16; B64D 31/10
USPC ............................................................ 701/4
See application file for complete search history.

(56) References Cited

U.S. PATENT DOCUMENTS

| 6,102,330 A | 8/2000 | Burken et al. | |
|---|---|---|---|
| 11,164,471 B1* | 11/2021 | Rupnik | G08G 5/045 |
| 11,846,953 B2* | 12/2023 | Hansman, Jr. | B64D 27/02 |
| 2007/0157864 A1* | 7/2007 | Aldin | B63H 9/10 |
| | | | 114/281 |
| 2012/0032030 A1* | 2/2012 | Ruckes | B64C 9/18 |
| | | | 244/215 |

(Continued)

FOREIGN PATENT DOCUMENTS

EP          3257747 B1      8/2020

*Primary Examiner* — Shardul D Patel
(74) *Attorney, Agent, or Firm* — Duane Morris LLP

(57) ABSTRACT

An aircraft may include a tail having a rudder and a pair of wings. The pair of wings may include at least one flap and at least one roll control device. The aircraft may also include at least two thrust-producing devices. The aircraft may also include a differential thrust control system including a computing device having at least one processor. The at least one processer may be configured to control an attitude of the aircraft by selectively operating the at least two thrust-producing devices, the rudder, and the at least one roll control device based at least in part on a plurality of conditions provided by a plurality of sensors on the aircraft and a selected mode setting of a mode control panel. The computing device may be communicatively coupled to the at least two thrust-producing devices, the rudder, and the at least one roll control device.

20 Claims, 12 Drawing Sheets

(56) References Cited

U.S. PATENT DOCUMENTS

| | | | |
|---|---|---|---|
| 2012/0109424 A1* | 5/2012 | Fervel | B64C 13/505 |
| | | | 701/3 |
| 2016/0011600 A1* | 1/2016 | Chubb | B64C 17/00 |
| | | | 701/4 |
| 2020/0290742 A1* | 9/2020 | Kumar | B64D 27/24 |
| 2022/0009625 A1* | 1/2022 | Bower | B64D 27/24 |
| 2023/0063801 A1 | 3/2023 | Courtin et al. | |
| 2023/0205229 A1 | 6/2023 | Masefield et al. | |
| 2023/0280764 A1 | 9/2023 | Hansman, Jr. et al. | |

* cited by examiner

SYSTEM AND METHOD FOR CONTROLLING DIFFERENTIAL THRUST OF A BLOWN LIFT AIRCRAFT

CROSS REFERENCE TO RELATED APPLICATIONS

This application is a continuation of U.S. patent application Ser. No. 18/114,828 filed Feb. 27, 2023, now U.S. Pat. No. 11,846,953, which claims the benefit of priority under 35 U.S.C. § 119(e) to prior U.S. Provisional Application No. 63/315,203 filed on Mar. 1, 2022, the disclosure of which is incorporated by reference herein in its entirety.

FIELD OF DISCLOSURE

The present disclosure generally relates to the field of aviation. More specifically, the present disclosure generally relates to a differential thrust control system for a blown lift aircraft configured to differentially power the blown lift aircraft's thrust-producing devices in response to adverse flight conditions.

BACKGROUND

In flight, an aircraft has to overcome a variety of aerodynamic moments that interfere with the aircraft's stability in three different axes (roll, pitch, and yaw). Typically, an aircraft's control surfaces are used to control movement about these axes. For example, in order to control yaw, a rudder connected to the tail of an aircraft is normally moved about the vertical axis which provides yaw moment to control yaw and to counteract any undesirable yaw moment. Undesirable yaw moments can be caused by a wind gust, engine failure on one side of the aircraft, or different drag between the wings. The rudder may also be used to compensate for adverse yaw moments from an aileron that is deflected and to damp yaw oscillations when the vertical tail of the aircraft provides insufficient natural yaw damping.

Control systems that compensate for yaw oscillations use a "yaw damper" system operating on the rudder. This results in frequent cycling and use of the rudder, which can be undesirable. Additionally, some aircraft power systems use an autofeather function to reduce drag on engines that have failed, which may also help minimize undesirable yaw conditions. Some traditional aircraft have a feature that may automatically shutoff engines to compensate for engine failure, which also helps to minimize an undesirable yaw condition.

The present disclosure addresses the aforementioned challenges and problems for an aircraft with an undesired yaw condition. The present disclosure may help counteract undesired yaw conditions from an engine failure or adverse yaw where the undesired yaw condition cannot be compensated for by the aerodynamic force of the rudder alone, especially at the low airspeeds typical for a blown lift aircraft. Embodiments of the present disclosure advantageously allow for the automatic application of differential thrust to compensate for the undesired yaw moment and allow for the use of a smaller rudder compared to that of conventional aircraft.

SUMMARY OF THE DISCLOSURE

In some embodiments, a blown lift aircraft may include a tail having a rudder and a pair of wings including a first wing and a second wing. The first wing and the second wing may each include at least one flap and at least one roll control device operatively coupled to the first wing and the second wing. The blown lift aircraft may also include at least two thrust-producing devices operatively coupled to each of the first wing and the second wing. The blown lift aircraft may also include a differential thrust control system having a computing device with at least one processor configured to control an attitude of the blown lift aircraft. The controlling of an attitude of the blown lift aircraft may include selectively operating the at least two thrust-producing devices on each of the first wing and the second wing, the rudder, and the at least one roll control device on the first wing and the second wing based at least in part on a plurality of conditions provided by a plurality of sensors on the blown lift aircraft and a selected mode setting of a mode control panel. The computing device may be communicatively coupled to the at least two thrust-producing devices on the first wing and the second wing, the rudder, and the at least one roll control device on the first wing and the second wing.

In some embodiments, a method of controlling an attitude of a blown lift aircraft may include receiving, at a computing device, a selected mode setting of a mode control panel. The mode control panel may have at least two selectable mode settings and may be communicatively coupled to the computing device. The computing device may contain at least one processor configured to control the attitude of the blown lift aircraft. The method may also include evaluating a plurality of conditions from a plurality of sensors on the blown lift aircraft having a pair of wings with a first wing and second wing, a rudder operatively coupled to a tail of the blown lift aircraft, at least one roll control device operatively coupled to the first wing and the second wing, and at least two thrust-producing devices operatively coupled to each of the first wing and the second wing. The method may also include transmitting a power signal to the at least two thrust-producing devices operatively coupled to each of the first wing and the second wing based at least in part on the evaluation of the plurality of conditions from the plurality of sensors and a selected mode setting of a mode control panel. The method may also include transmitting an actuation signal to the rudder and the at least one roll control device on the first wing and the second wing based at least in part on the evaluation of the plurality of conditions from the plurality of sensors and a selected mode setting of a mode control panel. The method may also include controlling the attitude of the blown lift aircraft by selectively operating the at least two thrust-producing devices on each of the first wing and the second wing based on the transmitted power signal and by selectively operating the rudder and the at least one roll control device on the first wing and the second wing based on the transmitted actuation signal.

In some embodiments, a non-transitory computer readable medium may have instructions stored thereon. The instructions, when executed by at least one processor, may cause a computing device to perform operations that may include receiving, at the computing device, a selected mode setting of a mode control panel. The mode control panel may have at least two selectable mode settings and may be communicatively coupled to the computing device. The computing device may be configured to control an attitude of a blown lift aircraft. The operations may also include evaluating a plurality of conditions from a plurality of sensors on the blown lift aircraft having a pair of wings with a first wing and second wing, a rudder operatively coupled to a tail of the blown lift aircraft, at least one roll control device operatively coupled to the first wing and the second wing. The blown lift aircraft may also have at least two thrust-producing devices operatively coupled to each of the first wing and the second wing. The operations may also include transmitting a power signal to the at least two thrust-producing devices operatively coupled to each of the first wing and the second wing based at least in part on the evaluation of the plurality of conditions from the plurality of sensors and a selected mode setting of a mode control panel. The operations may also include transmitting an actuation signal to the rudder and the at least one roll control device on the first wing and the second wing based at least in part on the evaluation of the plurality of conditions from the plurality of sensors and a selected mode setting of a mode control panel. The operations may also include controlling the attitude of the blown lift aircraft by selectively operating the at least two thrust-producing devices on each of the first wing and the second wing based on the transmitted power signal and by selectively operating the rudder and the at least one roll control device on the first wing and the second wing based on the transmitted actuation signal.

As will be disclosed herein, the differential thrust control system is used to automatically apply differential thrust to the electric propulsion units EPUs, which may be used to increase the aircraft's stability, simplify the pilot's operation in undesirable flight conditions, and even enhance the aircraft design by allowing for the use of a smaller vertical tail and/or rudder than would otherwise be needed without the control system.

BRIEF DESCRIPTION OF THE DRAWINGS

The foregoing and other advantages of the present disclosure will become apparent upon reading the following detailed description and upon reference to the drawings.

Figure 1:
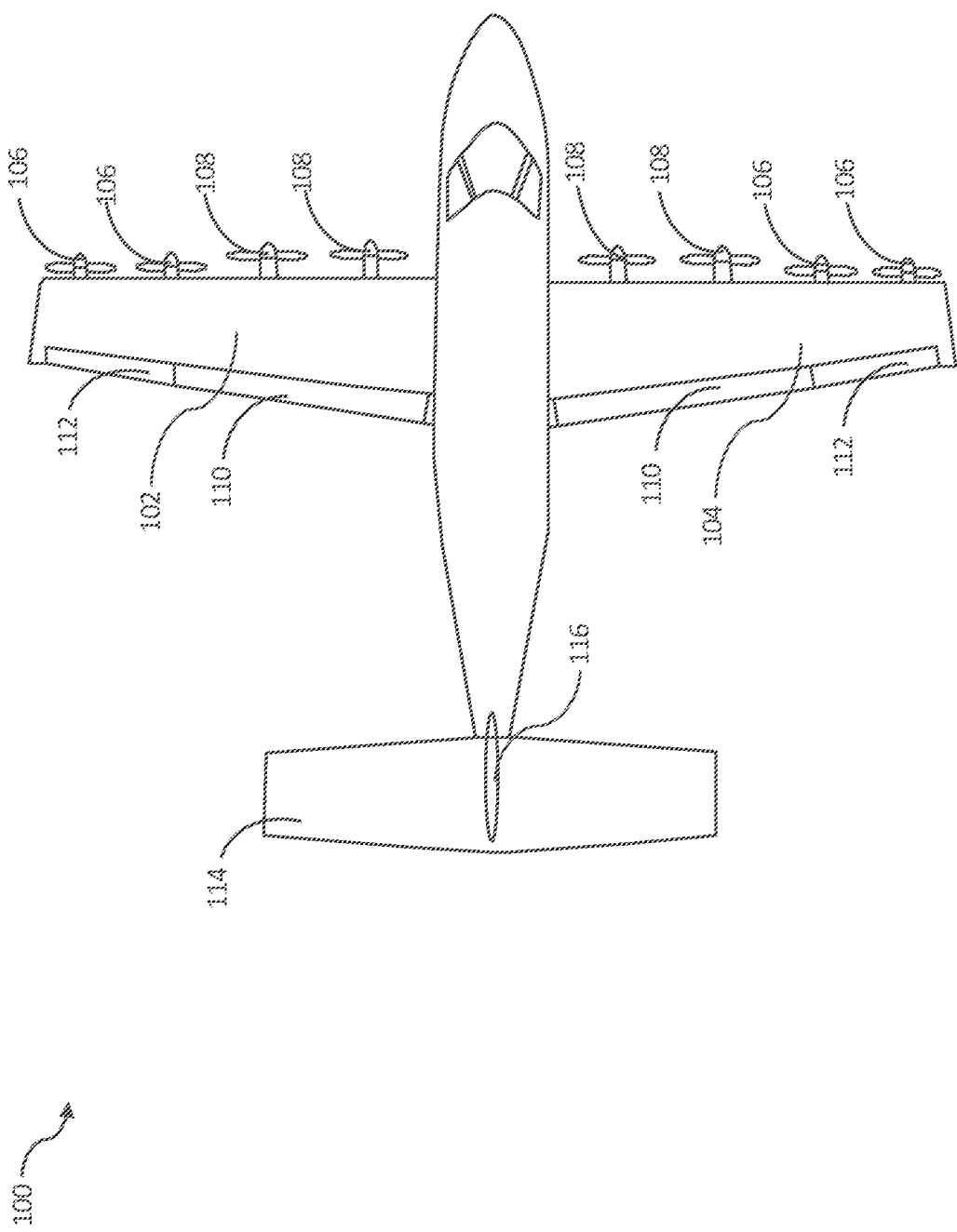
FIG. 1 is a top view of a blown lift aircraft with a plurality of thrust-producing devices in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

The present disclosure is directed to a system and method of use for a differential thrust control system that may compensate for undesired yaw conditions from a variety of causes. According to various embodiments, the differential thrust (or yaw) control system is used in a blown lift aircraft with electric propulsion having short takeoff and landing (eSTOL) capabilities, which operates at such low airspeeds that the aerodynamic control surfaces have limited authority. In some embodiments, the control system could be used in an aircraft with vertical takeoff and landing (e.g., VTOL) capabilities or a conventional aircraft with conventional means for producing thrust.

FIG. 1 is a top view of a blown lift aircraft 100 in accordance with some embodiments. The blown lift aircraft 100 has a pair of wings with a first wing 102 and a second wing 104. Both of the first wing 102 and the second wing 104 has at least one outboard thrust-producing device 106 and at least one inboard thrust-producing device 108 operatively coupled to the first wing 102 and the second wing 104. In some embodiments, there are at least two outboard thrust-producing devices 106 and two inboard thrust-producing devices 108 per wing 102, 104. In other embodiments, there are four thrust-producing devices 106, 108 on each of the first wing 102 and the second wing 104. The thrust-producing devices may be electric propulsion units (EPUs) 106, 108 part of a distributed electric propulsion system. The EPUs 106, 108 may include propellers to produce thrust needed for the blown lift aircraft 100. The first wing 102 and the second wing 104 may also include a flap 110 and at least one roll control device 112 (i.e., ailerons or spoilers) operatively coupled to the first wing 102 and the second wing 104. In some embodiments, the blown lift aircraft 100 may also include a tail 114 with a rudder 116 configured to control the yaw moment of the blown lift aircraft 100.

A blown lift aircraft 100, in some embodiments, generally refers to an aircraft that comprises at least two thrust-producing devices 106 and/or 108 disposed along each wing 102, 104 of the aircraft 100. The thrust-producing devices 106 and/or 108 develop slipstreams that blow over a substantial portion of the wing 102, 104 and augment the lift generated. In some embodiments the control surfaces of the aircraft 100, such as the flaps 110 and ailerons 112 (or flaperons), may be deflected or drooped to interact with the slipstreams from the thrust-producing devices 106, 108 further augmenting the lift produced. Further disclosure of a blown lift aircraft 100 can be found in U.S. patent application Ser. No. 17/560,383 filed on Dec. 23, 2021, the disclosure of which is incorporated by reference herein in its entirety.

Figure 2:
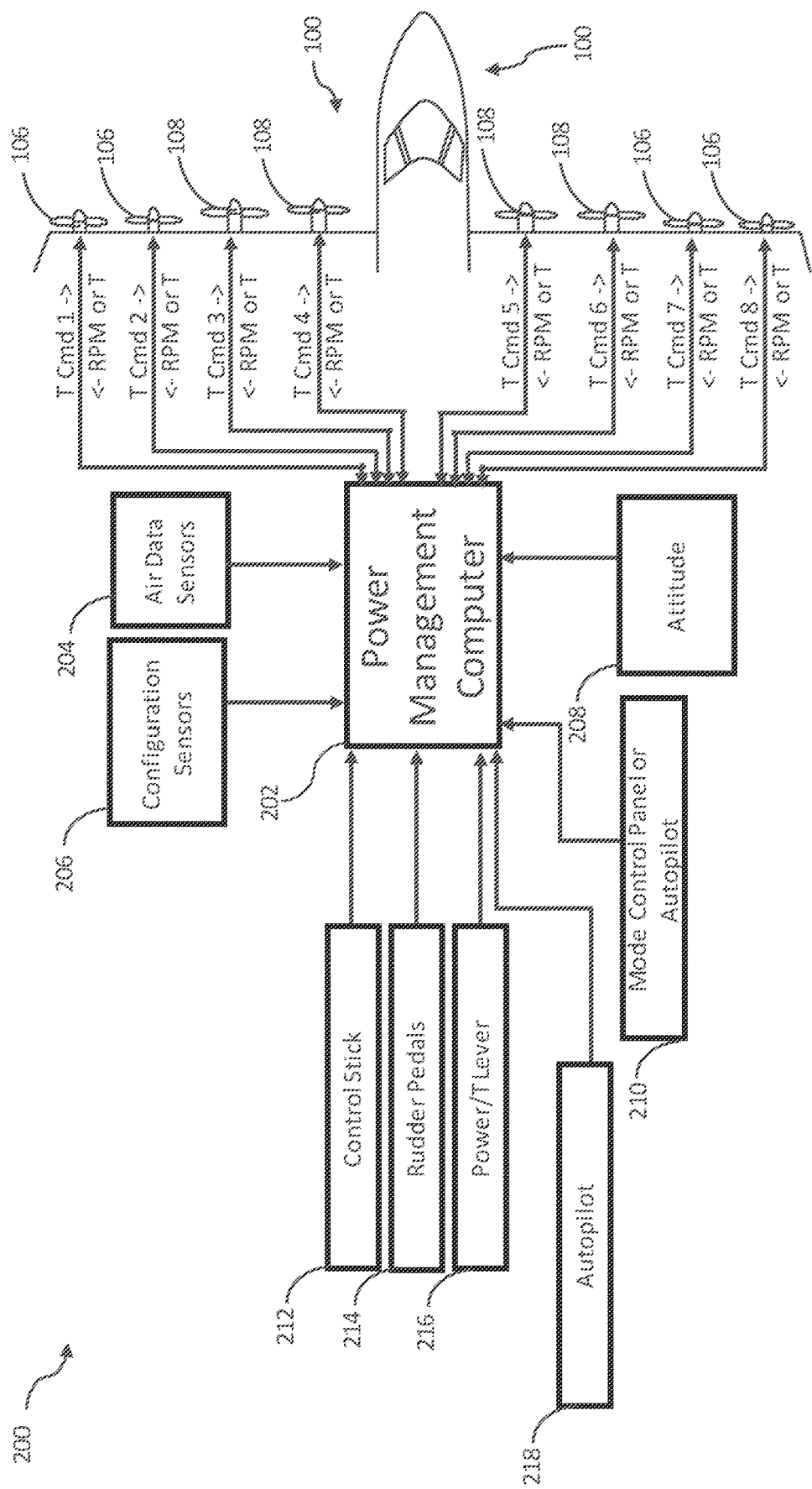
FIG. 2 is an exemplary computing device for controlling the differential thrust of the blown lift aircraft in accordance with some embodiments.

FIG. 2 is an exemplary block diagram of the differential thrust control system 200 in accordance with some embodiments. The differential thrust control system 200 may include one or more power management computers (PMCs) 202 operatively coupled to the blown lift aircraft 100 and communicatively coupled to the thrust producing devices 106, 108, the rudder 116, and the at least one roll control device 112 on the first wing 102 and the second wing 104.

In various embodiments, the one or more PMCs 202 have a plurality of modules used to provide inputs to the differential thrust control system 200, which is configured to control the thrust-producing devices 106, 108, the rudder 116, and the at least one roll control device 112 on the first wing 102 and the second wing 104. These PMC 202 modules may include an air data sensors module 204, a configuration sensors module 206, an attitude module 208, mode control panel 210, control stick 212, rudder pedals 214, power or thrust lever 216, autopilot module 218, and each thrust-producing device 106, 108 as illustrated in FIG. 2. The PMC 202 may take inputs from the modules described above and illustrated in FIG. 2 to calculate the needed power signal for each individual EPU 106, 108. The PMC 202 will then transmit the power signals to each of the EPUs 106, 108 as necessary based on the calculations performed in the PMC 202. The PMC 202 may, in some embodiments, rely on a software partition or another chip or card that may perform the functions of the control system. A person of ordinary skill in the art will appreciate that a variety of additional inputs may be provided to the PMC 202 for calculating and transmitting the desired power signal for the EPUs 106, 108 needed to compensate for undesirable flight conditions.

In various embodiments, air data sensors module 204 is configured to be processed by the PMC(s) 202 from a plurality of on-board sensors such as pitot and static probes, angle of attack and sideslip probes, total or static air temperature probes, radar altimeter, normal acceleration and global positioning system (GPS) data based on altitude, position, and atmospheric conditions. In various embodiments, additional data may be obtained from satellite or terrestrial transmitters. A person of ordinary skill in the art will appreciate that various sensors may be used and the above-mentioned list is not exhaustive or limiting. The sensors will provide information about the aircraft's airspeed, altitude (density and physical), and velocity vector. In various embodiments, the air data sensors module 204 is operatively coupled to the configuration sensors module 206 and, together with an input on the current aircraft weight, calculate the airspeed margin above the stall speed based on the aircraft configuration (i.e., flap 110 deflection, aileron/flaperon 112 deflection, etc.), which can be used to provide optimum targets. The aforementioned optimum targets may include a desired power level for the EPUs 106, 108, including commanding different power levels for the inboard EPUs 108 and outboard EPUs 106 as necessary depending on various aircraft maneuvers and failure scenarios. In various embodiments the air data sensors module 204 is configured to be an input to the autopilot module 218, or fly-by-wire system, in order to stabilize the speed or angle of attack during the approach and landing phases of flight.

According to some embodiments, aircraft data such as flap 110 deflection, roll control device 112 position (i.e., spoiler or aileron), slat extension, trim settings, landing gear extension, aircraft weight, and center of gravity will be processed by the configuration sensors module 206 and be received via the PMC(s) 202 to be used in the overall calculation of target thrust-producing device 106, 108 power level. In various embodiments, the flap 110, slat, and/or landing gear extension will determine the lift, drag, and pitching moment information of the blown lift aircraft 100 from reference algorithms, lookup tables, and/or machine learned models. The PMC(s) 202 is configured to use the actual status information of the aircraft configuration (i.e., flap 110 deflection, aileron/flaperon 112 deflection, etc.) to control the thrust-producing device 106, 108 power level according to a calculation method such as lookup tables, referencing an algorithm, and/or utilizing a machine learned model to achieve the desired flight path angle or target state.

In some embodiments, the differential thrust control system 200 also includes an attitude module 208 in order to provide the PMC(s) 202 with the attitude of the aircraft. The attitude module 208 may provide yaw rate, yaw angle, roll rate, and/or roll angle of the aircraft from yaw or pitch rate sensors. The attitude of the aircraft may be provided from a plurality of sensors such as an Attitude Heading Reference System (AHRS), a gyro, Inertial Navigation System, and/or other similar systems. The attitude module 208 may work in conjunction with various data from the air data sensors module 204 and/or the configuration sensors module 206, and processed by the PMC(s) 202 in order to ensure the blown lift aircraft 100 is maintained within acceptable values of pitch angles. For example, the air data sensors module 204 may provide the airspeed of an aircraft and the configuration sensors module 206 provides the position of the rudder 116, the PMC(s) 202 would process the data and could adjust the power level of the EPUs 106, 108 as needed to maintain acceptable yaw values. The PMC(s) 202 may also use this data in conjunction with data from modules of FIG. 2 to power the EPUs 106, 108 either together or differentially by commanding different power levels individually as needed.

In some embodiments, the differential thrust control system 200 may include one or more control modules to provide aircraft control inputs to the PMC 202. The control module inputs may include a roll control from a control stick 212 or other inceptor to control roll of the aircraft. The control module inputs may also include a rudder 116 command from rudder pedals 214 or other form inceptor to command the rudder 116 or yaw rate at a desired position or level. The control inputs may also include a power or thrust lever 216 position that provides a thrust input to the PMC 202. In some embodiments, the thrust input may from the control operator or lever of the flight path control system described in U.S. patent application Ser. No. 18/085,275 filed on Dec. 20, 2022, which is incorporated by reference herein in its entirety. The control module may be a single module or separate modules for the control stick 212, rudder pedals 214, and power/thrust lever 216. Additionally, the control module inputs may take an input from an autopilot module 218 if autopilot is activated, which may automatically provide roll, rudder, and thrust commands.

The differential thrust control system 200 may also include a mode control panel 210, which provides an input to the PMC 202 as to the selected setting or mode. The mode control panel 210 may have one or more settings. In some embodiments, the mode control panel 210 has at least five setting modes that correspond to a rudder augmentation mode, a roll augmentation mode, an automatic compensation of EPU failure mode, an adverse yaw compensation mode, and a yaw damping mode, all of which are described below. The mode control panel 210 may be a physical panel, switch, knob, etc. in the cockpit of the blown lift aircraft 100 for the pilot to operate. In other embodiments, the mode control panel 210 may be settings or softkeys on a touchscreen of a display. The mode control panel 210 may also have a mode setting set automatically based on the control from the autopilot module 218 if activated. The various modes of the mode control panel 210 may be individually set so that only mode is selected at a time. In other embodiments, the mode control panel 210 may allow more than one of the mode settings to be selected at a time. For example, the rudder augmentation mode may be set at the same time the yaw damping mode is set.

In various embodiments, the autopilot module 218 is configured to provide information to the PMC(s) 202 of activation or status (i.e., if autopilot is on or off) and commanded flight phase or mode of operation of the autopilot module 218. In other embodiments, the autopilot module 218 may utilize one or more algorithms, lookup tables, and/or machine learned model within a fly-by-wire system. Yet in other embodiments, the autopilot module 218 is configured to receive input from the PMC(s) 202 and optimize the selected mode setting of the mode control panel 210. The autopilot module 218 may also assist in holding airspeed, maintaining or adjusting angle of attack, and maintaining or changing flight altitude. The power level commanded to the thrust-producing devices 106, 108 by the PMC(s) 202 may also be used by the autopilot module 218 based on the autopilot module 218 parameters and/or selected setting of the mode control panel 210. According to various embodiments, the autopilot module 218 may be interchangeable with a fly-by-wire system or module.

In various embodiments, the autopilot module 218 or fly-by-wire system is configured to provide an input to the PMC 202 of activation, target state, and mode of operation of the differential thrust control system 200. In other embodiments, the autopilot module 218 may be a set of algorithms within a fly-by-wire system. The power commanded to the EPUs 106, 108 by the PMC 202 may also be used by the autopilot module 218. In some embodiments, the PMC 202 may provide input to the autopilot module 218 to deflect the control surfaces, such as the flaps 110 and ailerons 112.

The differential thrust control system 200 may also include inputs to the PMC 202 as to the status of each EPU 106, 108. The status of the EPUs 106, 108 may include a thrust or power level, temperature, rpm level, current, voltage, etc. that may be used by the PMC 202 to determine the needed differential power signal to send to each EPU 106, 108.

Figure 3:
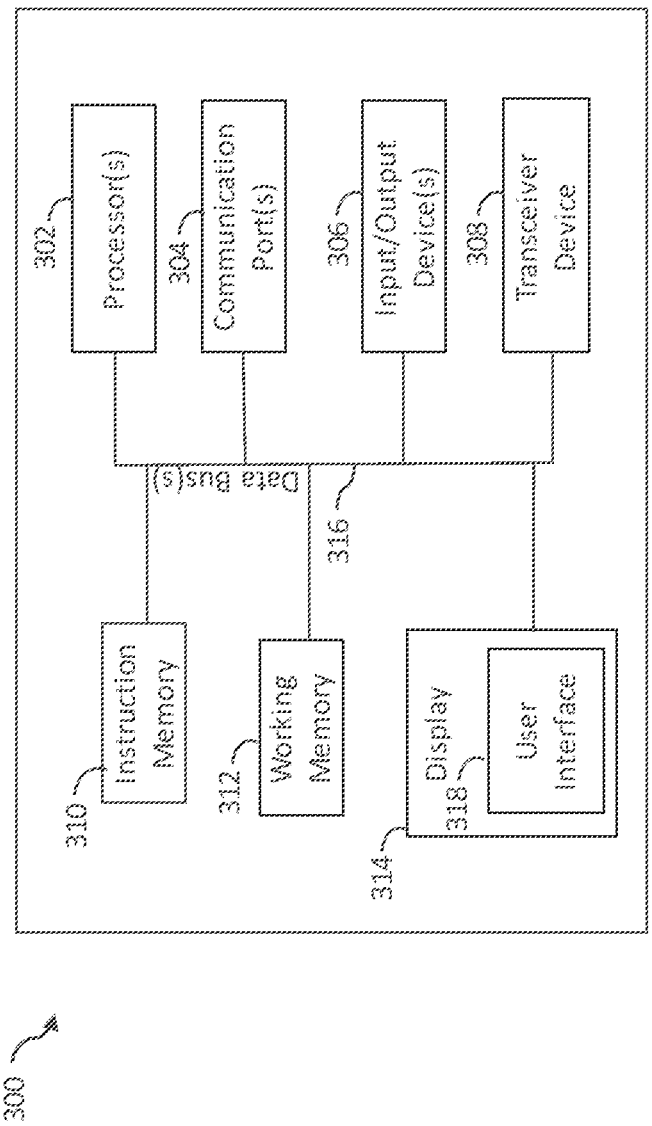
FIG. 3 is an exemplary block diagram of the differential thrust control system in accordance with some embodiments.

FIG. 3 is a block diagram of an example computing device 300 in accordance with some embodiments. The computing device 300 can be employed by a disclosed system or used to execute a disclosed method of the present disclosure. Computing device 300, such as the power management computer (PMC) 202 in FIG. 2, can implement, for example, one or more of the functions described herein. It should be understood, however, that other computing device configurations are possible.

Computing device 300 can include one or more processors 302, one or more communication port(s) 304, one or more input/output devices 306, a transceiver device 308, instruction memory 310, working memory 312, and optionally a display 314, all operatively coupled to one or more data buses 316. Data buses 316 allow for communication among the various devices, processor(s) 302, instruction memory 310, working memory 312, communication port(s) 304, and/or display 314. Data buses 316 can include wired, or wireless, communication channels. Data buses 316 are connected to one or more devices. In some embodiments, the data bus 316 may be a Controller Area Network (CAN) bus, Aeronautical Radio INC. (ARINC) 429 bus, or any one of the Institute of electrical and Electronics Engineers (IEEE) buses available.

Processor(s) 302 can include one or more distinct processors, each having one or more cores. Each of the distinct processors 302 can have the same or different structures. Processor(s) 302 can include one or more central processing units (CPUs), one or more graphics processing units (GPUs), application specific integrated circuits (ASICs), digital signal processors (DSPs), and the like.

Processor(s) 302 can be configured to perform a certain function or operation by executing code, stored on instruction memory 310, embodying the function or operation of the differential thrust control system 200 illustrated in FIG. 2. For example, processor(s) 302 can be configured to perform one or more of any function, method, or operation disclosed herein.

Communication port(s) 304 can include, for example, a serial port such as a universal asynchronous receiver/transmitter (UART) connection, a Universal Serial Bus (USB) connection, or any other suitable communication port or connection. In some examples, communication port(s) 304 allows for the programming of executable instructions in instruction memory 310. In some examples, communication port(s) 304 allow for the transfer, such as uploading or downloading, of data.

Input/output devices 306 can include any suitable device that allows for data input or output. For example, input/output devices 306 can include one or more of a keyboard, a touchpad, a mouse, a stylus, a touchscreen, a physical button, a speaker, a microphone, or any other suitable input or output device.

Transceiver device 308 can allow for communication with a network, such as a Wi-Fi network, an Ethernet network, a cellular network, or any other suitable communication network. For example, if operating in a cellular network, transceiver device 308 is configured to allow communications with the cellular network. Processor(s) 302 is operable to receive data from, or send data to, a network via transceiver device 308.

Instruction memory 310 can include an instruction memory 310 that can store instructions that can be accessed (e.g., read) and executed by processor(s) 302. For example, the instruction memory 310 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 310 can store instructions that, when executed by one or more processors 302, cause one or more processors 302 to perform one or more of the operations of a differential thrust control system 200.

In addition to instruction memory 310, the computing device 300 can also include a working memory 312. Processor(s) 302 can store data to, and read data from, the working memory 312. For example, processor(s) 302 can store a working set of instructions to the working memory 312, such as instructions loaded from the instruction memory 310. Processor(s) 302 can also use the working memory 312 to store dynamic data created during the operation of computing device 300. The working memory 312 can be a random access memory (RAM) such as a static random access memory (SRAM) or dynamic random access memory (DRAM), or any other suitable memory.

Display 314 is configured to display user interface 318. User interface 318 can enable user interaction with computing device 300. In some examples, a user can interact with user interface 318 by engaging input/output devices 306. In some examples, display 314 can be a touchscreen, where user interface 318 is displayed on the touchscreen.

There are many possible reasons for the blown lift aircraft 100 to experience an undesired yaw condition. The PMC 202, in some embodiments, may determine undesired yaw conditions automatically or by some pilot input. To determine undesired yaw conditions, the PMC 202 may sense an engine failure by monitoring individual EPUs 106, 108 power or thrust. The PMC 202 may also determine engine failure from the pilot's rudder control input, such as the rudder pedals 214. The PMC 202 may also determine an undesired yaw condition from a yaw rate sensor from the attitude module 208, the aircraft's inertial navigation system, control stick 212 indicator, air data sensors module 204 information, or a combination of the aforementioned sensors in conjunction with the detection logic described below. Additionally, in some embodiments the PMC 202 may also determine undesired yaw conditions from a yaw damping system, which could include inputs from yaw rate in the attitude module 208 and air data sensors module 204.

The differential thrust control system 200 used to control undesirable yaw conditions may depend on a feedback control system in some embodiments. In various embodiments, this could be a feedback control system used to feed yaw rate or other aircraft states back to the differential thrust control system 200, thus improving the dynamic response. In other embodiments the differential thrust control system 200 could use an open loop control system. The open loop control system could include a gain scheduling system, look up tables or machined learned models where the differential thrust control system 200 is scheduled based on the position of the aileron 112 and the airspeed of the aircraft to compensate for undesired yaw. In other embodiments the open loop control system could be similarly scheduled based on the rudder 116 input and the aircraft airspeed, increasing the control authority at low airspeeds. In other embodiments the open loop control system could be combined with a closed loop system for fine tuning differential power levels and improving the dynamic response. The differential thrust control system 200 may jointly or alternatively use other algorithms, lookup tables, and/or machine learned models to perform the operations of the differential thrust control system 200 described herein.

According to some embodiments, the differential thrust control system 200 is designed to minimize the change in total power. This is especially true in cases where the EPUs 106, 108 are at a maximum power condition. For a normal symmetric condition, meaning all engines operating, the power signal to increase thrust to the outboard engine or set of engines on the side requiring more thrust may be coupled with a corresponding reduction of thrust on the other side of the aircraft. If the outboard EPUs 106 reach their maximum thrust command, the inboard EPUs 108 would then increase thrust. Additionally, if all operational engines on the side requiring additional thrust reach their maximum thrust condition, then the differential thrust could be accomplished by reducing the thrust command on the side of the aircraft 100 requiring less thrust. In some embodiments, the differential thrust commanded in an engine failure (i.e., EPU failure) condition could rely on reducing thrust for the corresponding EPU(s) 106, 108 on the unaffected side of the aircraft. In this engine failure scenario, the remaining operational EPU(s) 106, 108 may be used to compensate for any residual undesired yaw.

Figure 4:
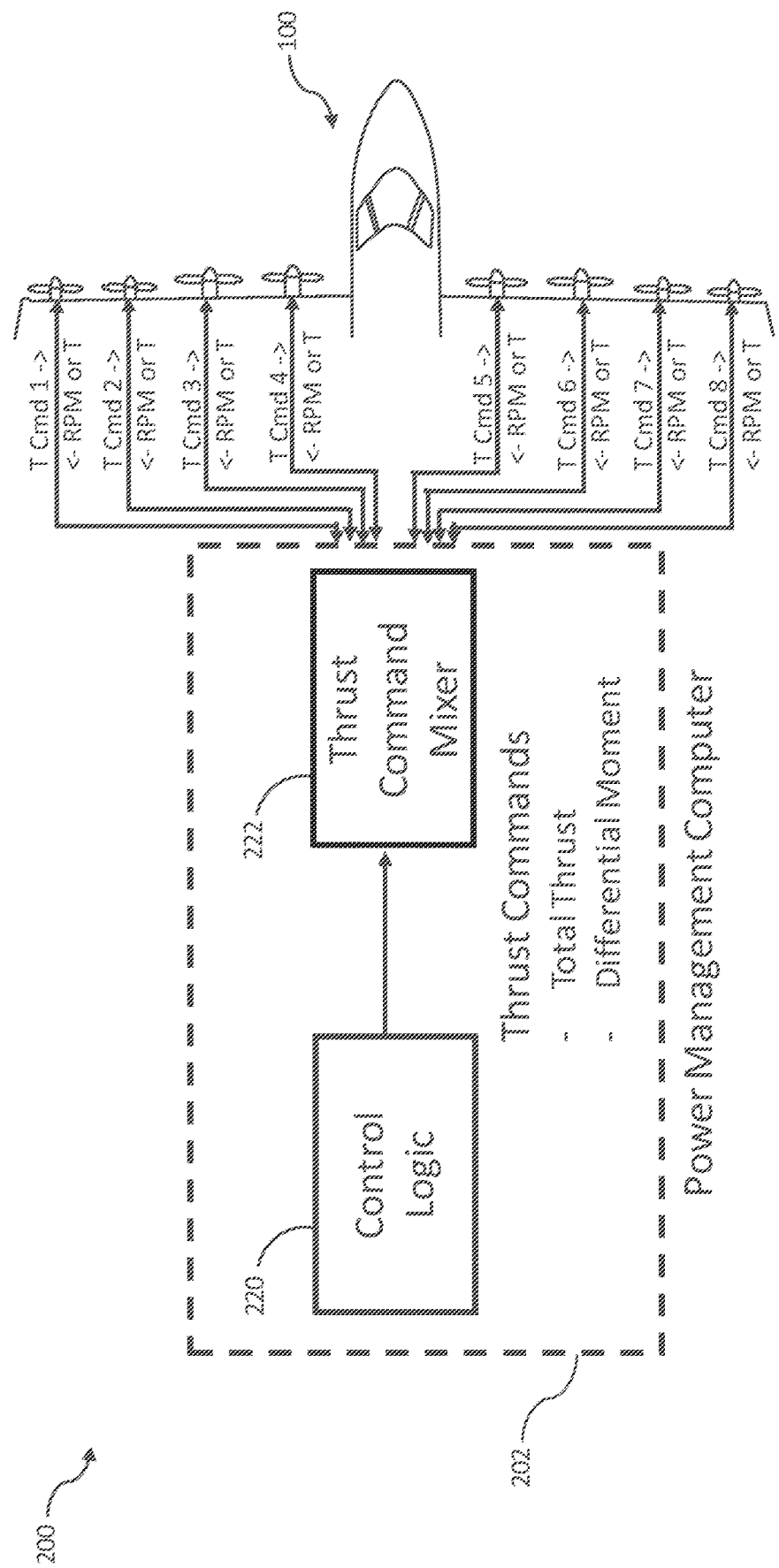
FIG. 4 is a block diagram showing some subcomponents of the power management computer in accordance with some embodiments.

FIG. 4 is a block diagram showing some subcomponents of the PMC 202 in accordance with some embodiments. Some of the subcomponents of the PMC 202 may include a control logic module 220 and a thrust command mixer module 222. In some embodiments, the differential thrust control system 200 may include at least one operating mode. In various embodiments, there may be at least five operating modes that can be operated individually or in combination with other modes through the mode control panel 210 or autopilot module 218 illustrated in FIG. 2. In various embodiments, the PMC 202 may include a plurality of subcomponents operatively coupled to the PMC 202. These subcomponents may perform a variety of functions, including performing the necessary control logic functions of the different operating modes of the differential thrust control system 200 in the control logic module 220. Another subcomponent of the PMC 202 may include a thrust command mixer module 222 that may determine the individual EPUs 106, 108 power level and the total commanded thrust for the blown lift aircraft 100 based on the results of the control logic module 220.

Figure 5A:
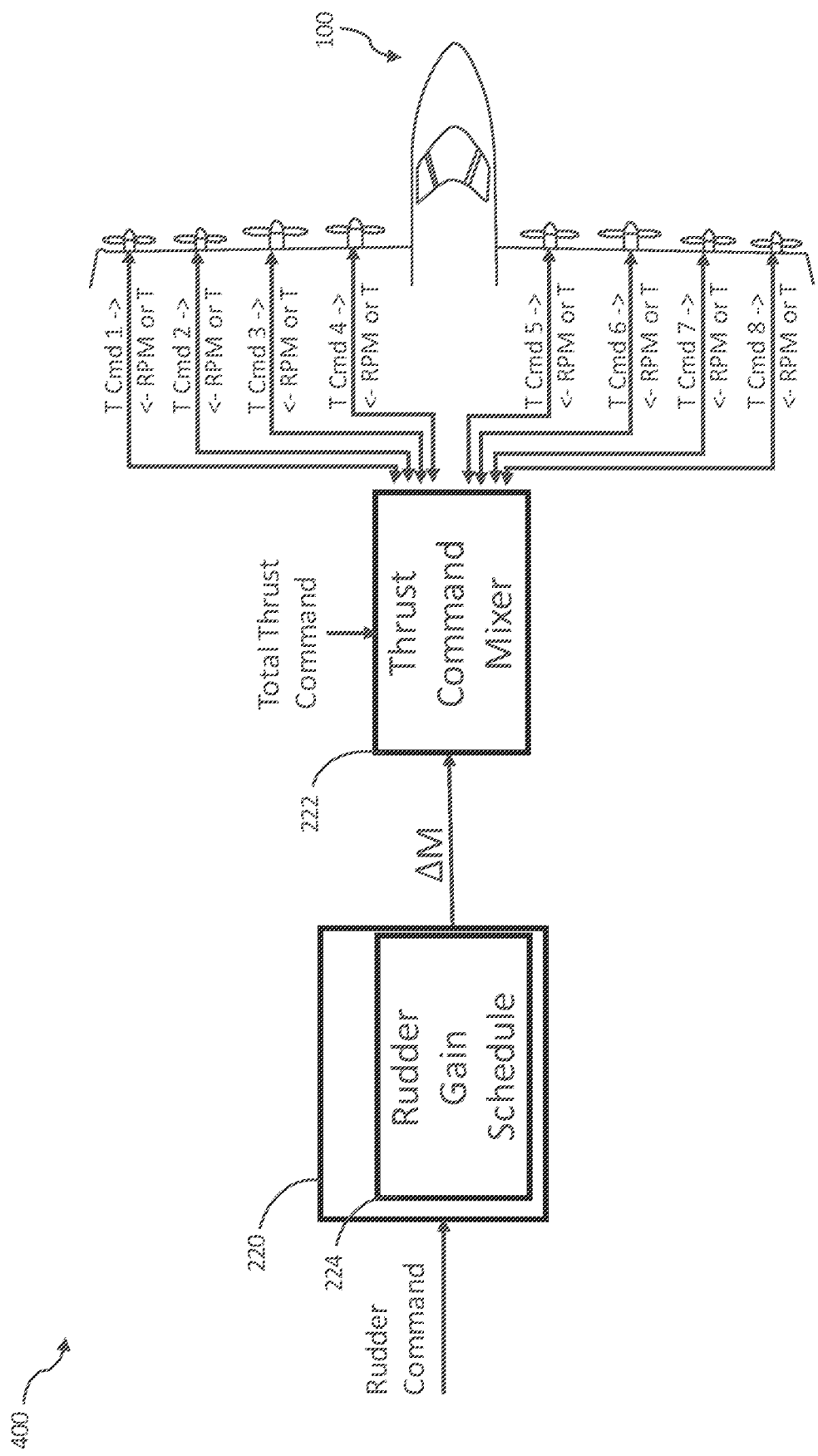
FIG. 5a is a block diagram of the logic the rudder augmentation mode in accordance with some embodiments.
Figure 5B:
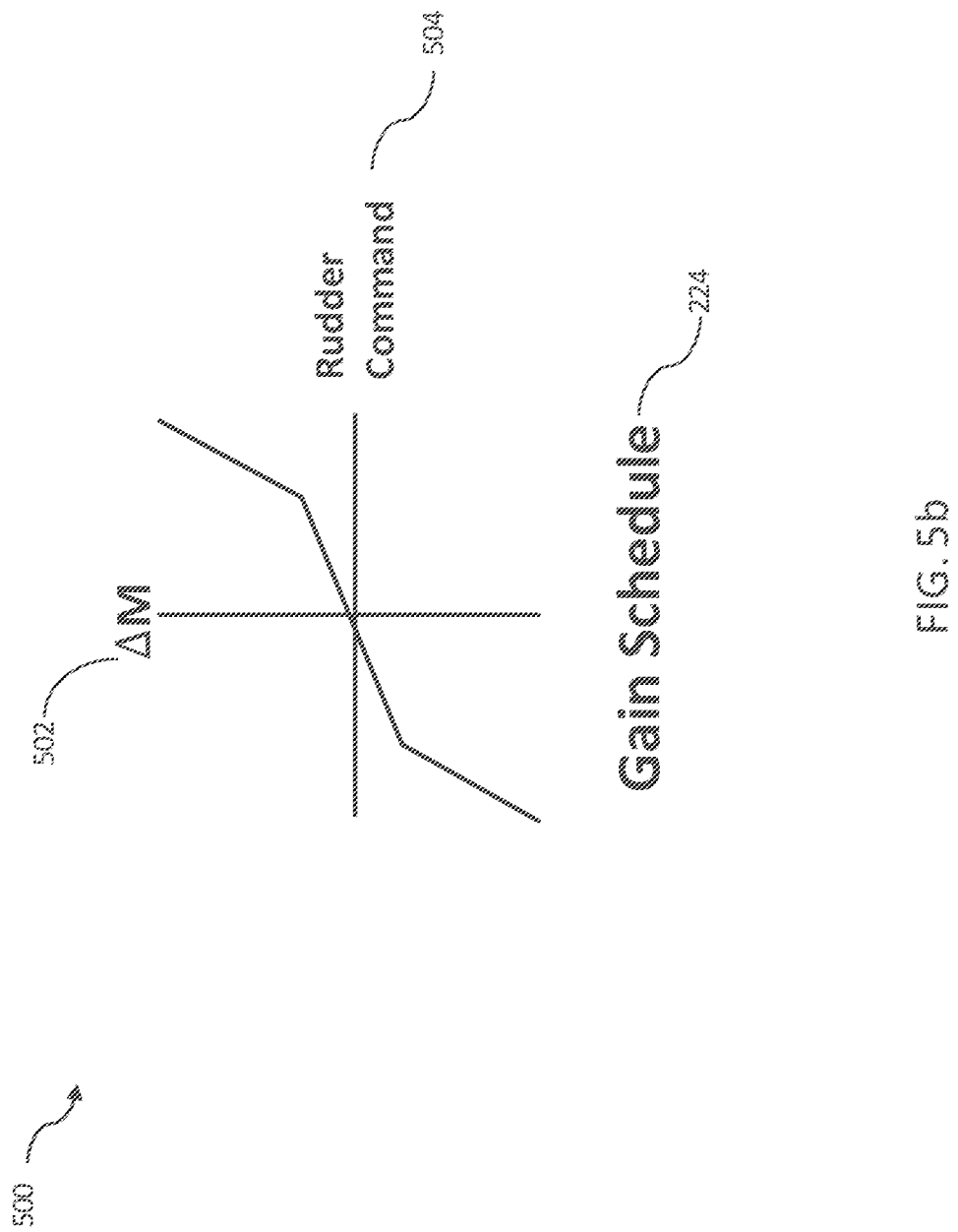
FIG. 5b is a graph of the rudder gain schedule in accordance with some embodiments.

FIG. 5a is a block diagram of the logic the rudder augmentation mode 400 in accordance with some embodiments. FIG. 5b is a graph of the rudder gain schedule 224 in accordance with some embodiments. The logic for the rudder augmentation mode 400 may consist of a rudder command input from rudder pedals 214, autopilot module 218, or some other rudder command and will feed into the control logic module 220 to determine the differential moment command (ΔM) based on a rudder gain schedule 224 illustrated in FIG. 5b. The rudder gain schedule 224 which may be a function of the moment to the EPU(s) 502 and the thrust from the EPU(s) 504. The equation for ΔM may be found below.

$$\Delta M = \Sigma_1^4 R_i T_i - \Sigma_5^8 R_i T_i$$

Where:
Ri is the moment arm to the EPUi
Ti is the Thrust from EPUi

In the rudder augmentation mode 400 (or mode 1) the differential thrust control system 200 may augment the rudder 116 authority for the blown lift aircraft 100 by providing differential thrust to increase the yaw moment in the direction of the rudder 116 position input. The augmentation of the rudder 116 may occur by differentially raising and/or lowering the left or right EPU 106, 108 power as appropriate to increase the yaw moment in the direction of the rudder 116 position input. For example, a rudder 116 position input to the left may cause the EPUs 106, 108 on the left side of the aircraft to receive a power signal to raise power. In some embodiments, the rudder 116 deflection to the left may also cause the EPUs 106, 108 on the right to lower in power. However, the raising and lowering power for the EPUs may be done either together in combination or limited to a change in power of one side only (i.e., only a raise in power on the left side or only lowering in power on the right side for the example above) according to some embodiments. In the event of an EPU 106, 108 failure condition, a linear or non-linear gain may be used to compensate for the failed engine depending on the embodiment.

In some embodiments, the thrust command mixer module 222 illustrated in FIG. 5a may determine the individual EPU 106, 108 commands to achieve the desired ΔM and total thrust command. The thrust command mixer module 222 may evaluate the available EPU(s) 106, 108, and how close the available EPU(s) 106, 108 are to a maximum thrust condition. In various embodiments, under nominal conditions, the differential thrust control system 200 in the rudder augmentation mode 400 may start by changing the outboard EPUs 106 power signal to achieve the desired ΔM and move to changing the inboard EPUs 108 power signal if additional control authority is required.

Figure 6:
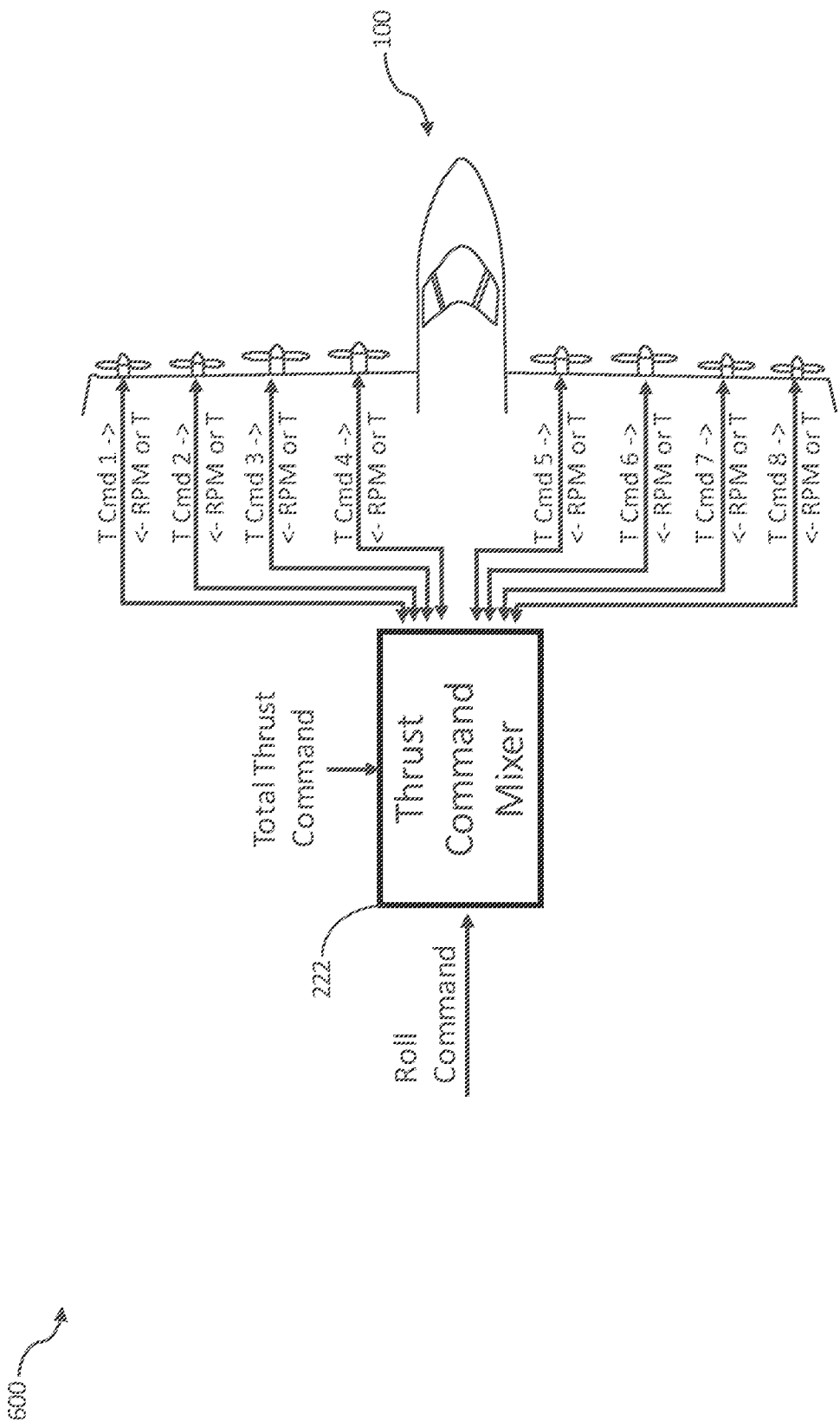
FIG. 6 is a block diagram of the logic for the roll augmentation mode in accordance with some embodiments.

FIG. 6 is a block diagram of the logic for the roll augmentation mode 600 in accordance with some embodiments. In the roll augmentation mode 600 augmentation of the aileron 112 or other roll control device occurs by increasing blowing over the aileron 112 or other roll control device according to some embodiments. The logic of the roll augmentation mode 600 of the differential thrust control system 200 may depend on a roll command interacting with the thrust command mixer module 222 in the PMC 202 according to some embodiments. The thrust command mixer module 222 may increase thrust from the EPU(s) 106, 108 on one side of the aircraft (i.e., the first wing 102 or the second wing 104) and subsequently reduce thrust on the opposite side to provide a roll moment in the desired direction.

The roll command may come from a variety of sources such as the control stick 212, autopilot module 218, etc. In other embodiments, the EPU(s) 106, 108 may modulate blowing in front of the ailerons 112 or other roll control devices to assist with the roll maneuver. Similar to the rudder augmentation mode 400, in the roll augmentation mode 600 the available EPU(s) 106, 108 are considered, as well as how close those available EPU(s) 106, 108 are to a maximum thrust condition before the thrust command mixer module 222 decides which EPU(s) 106, 108 to send the differential thrust command to. In some embodiments, the PMC 202 and/or autopilot module 218 may also command a change in position of the roll control devices 112 either individually (or differentially) or together in order to augment the necessary roll control of the aircraft 100. For example, the PMC 202 may take inputs from the modules illustrated in FIG. 2 and determine if the position of the roll control devices 112 need to change in order to control the roll of the aircraft. The PMC 202 may then transmit an actuation signal to the roll control devices 112 either together or differentially to change position of the roll control devices 112 to control the roll of the aircraft 100.

Figure 7:
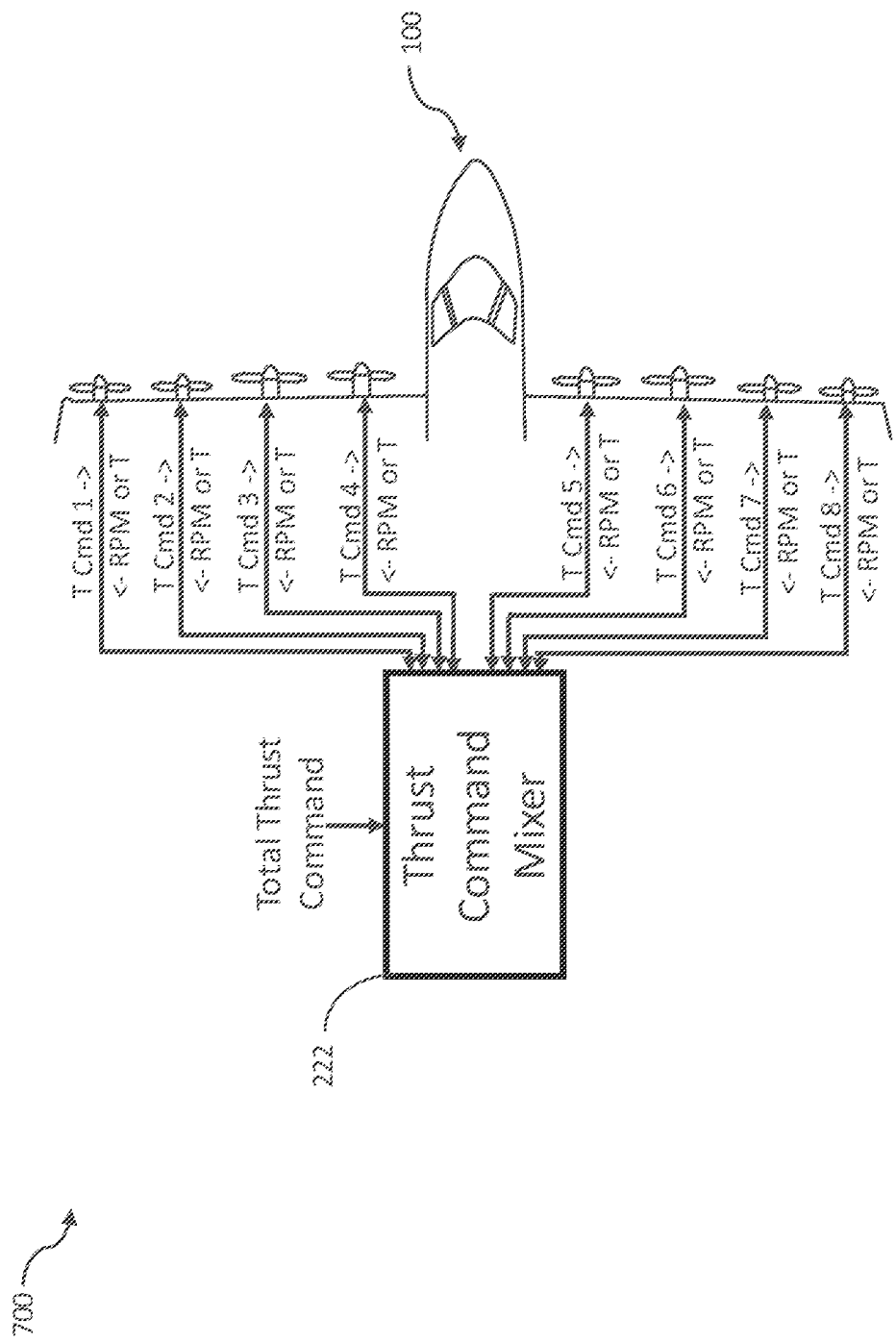
FIG. 7 is a block diagram of the logic for the automatic compensation of electric propulsion unit failure mode in accordance with some embodiments.

FIG. 7 is a block diagram of the logic for the automatic compensation of electric propulsion unit failure mode 700 in accordance with some embodiments. In the automatic compensation of EPU Failure mode 700 (or mode 3) the differential thrust control system 200 may automatically detect a loss of thrust from one or more EPU(s) 106, 108 and correct the undesired yaw condition by reducing thrust on the opposing side according to some embodiments. The automatic compensation of EPU Failure mode 700 may rely on an RPM or power signal from the EPU(s) 106, 108, a fault signal from the EPU(s) 106, 108, or other forms of detecting a fault in one of the EPU(s) 106, 108. This failure signal and/or reduction signal in RPM or thrust from the EPU(s) 106, 108 may be read by the thrust command mixer module 222. The thrust command mixer module 222 may then reduce power on the matching EPU(s) 106, 108 on the opposite side and/or increase the available power on the remaining EPU(s) 106, 108 on the affected side to achieve as much as the commanded total thrust as possible. One benefit of the rudder augmentation mode 400 and automatic compensation for EPU failure modes 700 would be the blown lift aircraft 100 could be designed with a smaller rudder 116 compared to other conventional aircraft. Asymmetric engine failure at takeoff is typically the condition that sizes the rudder 116 and vertical tail in conventional aircraft. Because of the slow takeoff speeds of eSTOL aircraft 100, the rudder 116 and vertical tails would be impractically large with conventional aerodynamic control.

Additionally, the PMC 202 may also control the position of the flaps 110 either individually or together to control the available lift of the aircraft 100. For example, if one or more EPUs 106,108 fail there may not be enough available power with the remaining EPUs 106, 108 alone to maintain stable flight. The PMC 202 may determine, based at least in part on the inputs illustrated in FIG. 2 that one or more of the flaps 110 positions need to change in order to maintain the necessary lift of the aircraft. Based on that determination, the PMC 202 may transmit an actuation signal to the flaps 110 either individually or together in order to maintain the necessary lift of the aircraft 100.

Figure 8:
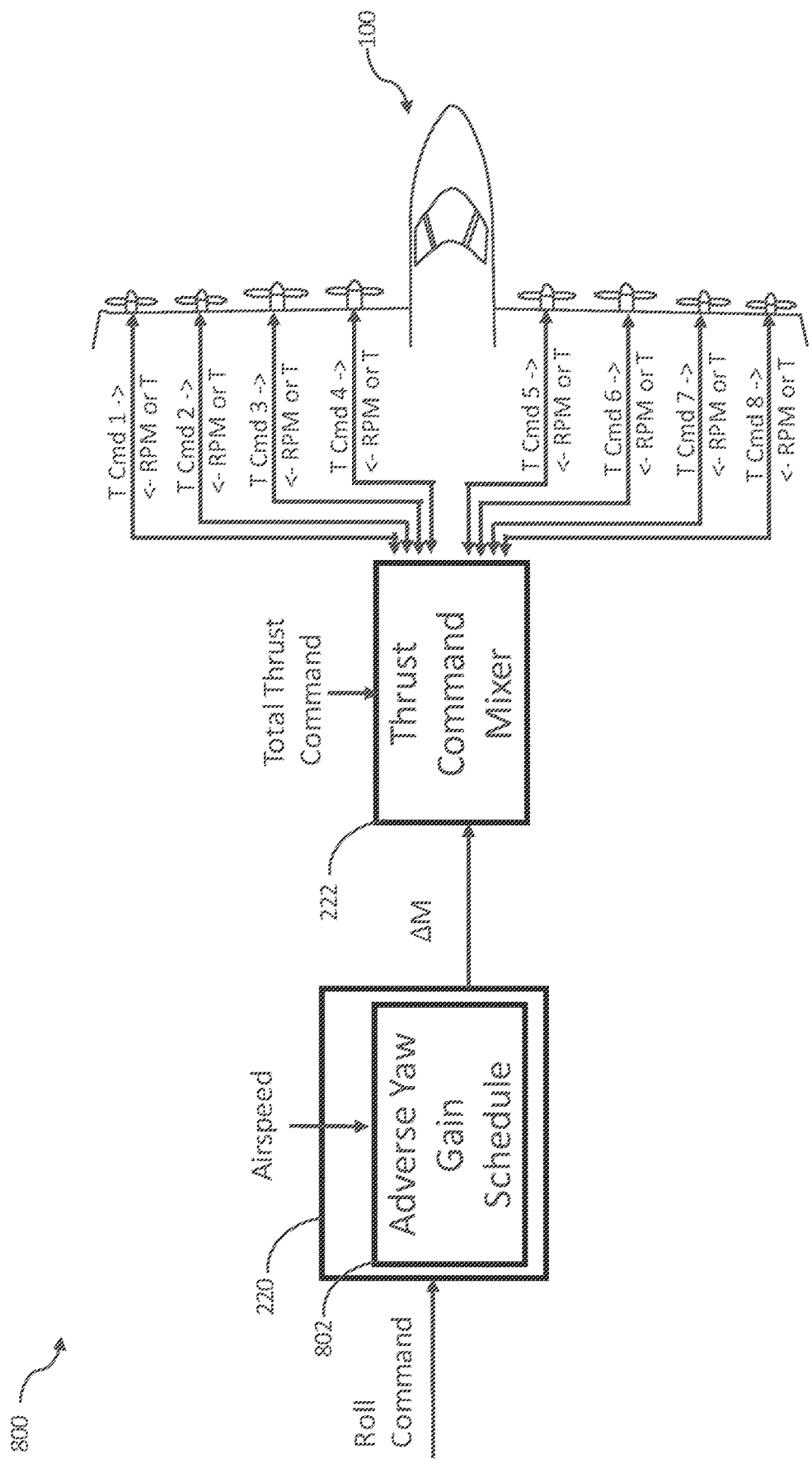
FIG. 8 is a block diagram of the logic for the adverse yaw compensation mode in accordance with some embodiments.

FIG. 8 is a block diagram of the logic for the adverse yaw compensation mode 800 in accordance with some embodiments. In adverse yaw compensation mode 800 (or mode 4) the differential thrust control system 200 may provide the differential thrust needed to offset the adverse yaw that may come from the ailerons 112 or other roll control device according to some embodiments. The adverse yaw compensation mode 800 may rely on an adverse yaw gain schedule 802 found in the control logic module 220 subcomponent. The adverse yaw gain schedule 802 may take inputs from a roll command, such as from the control stick 212 or autopilot module 218, and airspeed from the air data sensors module 204. The adverse yaw gain schedule 802 may then schedule the $\Delta M$ needed to counteract the adverse yaw determined by the roll command and airspeed. The thrust command mixer module 222 may then determine the individual EPU 106, 108 commands to achieve the desired $\Delta M$ and total commanded thrust. Similar to the rudder augmentation mode 400 and the roll augmentation modes 600, the thrust command mixer module 222 may evaluate the available EPU(s) 106, 108, and how close the available EPU(s) 106, 108 are to a maximum thrust condition. In various embodiments, under nominal conditions the differential thrust control system 200 in the rudder augmentation mode 400 may start by changing power on the most outboard EPUs 106 to achieve the $\Delta M$ and move to the inboard EPUs 108 if additional control authority is required.

Figure 9:
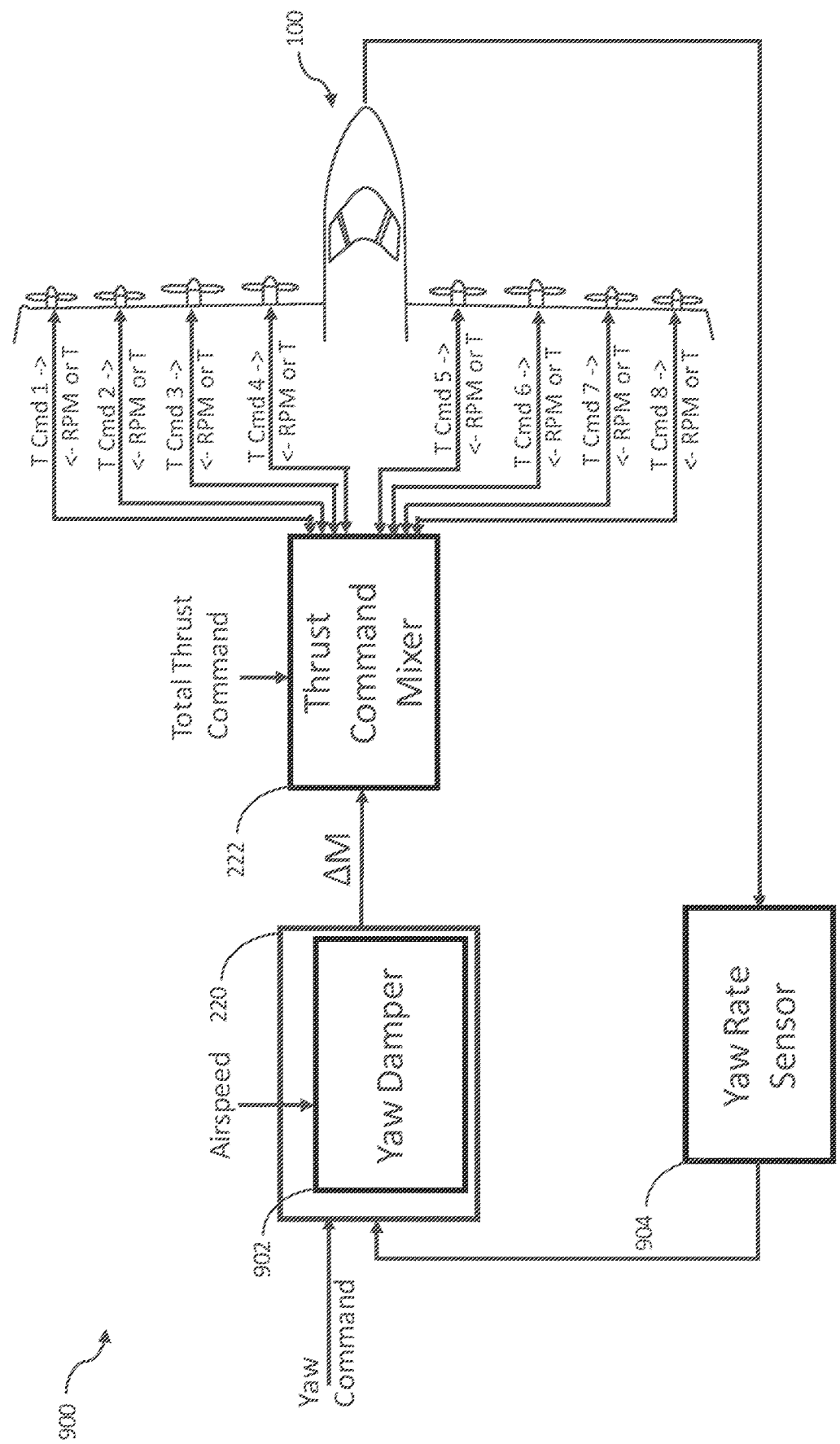
FIG. 9 is a block diagram of the logic for the yaw damping mode in accordance with some embodiments.

FIG. 9 is a block diagram of the logic for the yaw damping mode 900 in accordance with some embodiments. The yaw damping mode 900 may incorporate a yaw damper 902 housed in the control logic module 220 the thrust command mixer module 222 to provide commands to the EPUs 106, 108. The yaw damper 902 may take inputs from a yaw command, such from the rudder 116 position or from the autopilot module 218, and airspeed from the air data sensors module 204. In the yaw damping mode 900 high frequency yaw oscillations may be damped in the yaw damper 902 based on the feedback from the yaw rate sensor 904, which may come from the attitude module 208. The yaw damper 902 may calculate the desired $\Delta M$ to be used by the thrust command mixer module 222 to determine the needed differential thrust for the EPU(s) 106, 108 to overcome an undesired yaw oscillation. Usage of the yaw damping mode 900 may allow for a smaller vertical stabilizer than conventional aircraft.

In some embodiments, the differential thrust control system 200 may provide a "boost" signal to one of the EPU(s) 106, 108 on the same side of the aircraft 100 to overcome a lack of thrust from a failed engine on that side. In other embodiments, differential motor RPM may be commanded by the differential thrust control system 200 instead of thrust. In further embodiments, the differential propeller blade pitch of the EPUs 106, 108 is commanded by the differential thrust control system 200 thus allowing for differential thrust of the EPU(s) 106, 108 with higher or lower blade pitch.

Additionally, in some embodiments, the system could be used to increase the maximum sideslip angle of the blown lift aircraft 100, which would improve the crosswind landing ability. This could be done by allowing for differential aileron 112 deflection and/or roll spoiler settings with differential thrust compensation. In some embodiments, the differential thrust control system 200 could be used to automatically compensate for lateral wind gusts the blown lift aircraft 100 may encounter during the approach phase.

In other embodiments, the differential thrust control system 200 could be used to artificially augment the lateral stability of the blown lift aircraft 100. The artificial augmentation of lateral stability could allow for the reduction or elimination of the vertical tail size or area. It could also enhance handling qualities in all flight envelopes. In the low-speed flight envelope, the artificial augmentation of lateral stability could enhance the lateral stability when dynamic pressure is low over the rudder 116. In the high-speed flight envelope, the artificial augmentation may decrease the lateral stability and provide for acceptable handling provided the blown lift aircraft 100 is equipped with a large vertical tail or rudder 116. In some embodiments, the differential thrust control system 200 may be used in a blown lift aircraft 100 to decrease the low-speed minimum turn radius by increasing the blowing over the inboard wingtip to turn, thus helping to prevent tip stall. In other embodiments, the differential thrust control system 200 may be used on the ground to assist in minimizing the turn radius by the use of reverse thrust on one or more of the EPUs 106, 108.

Figure 10:
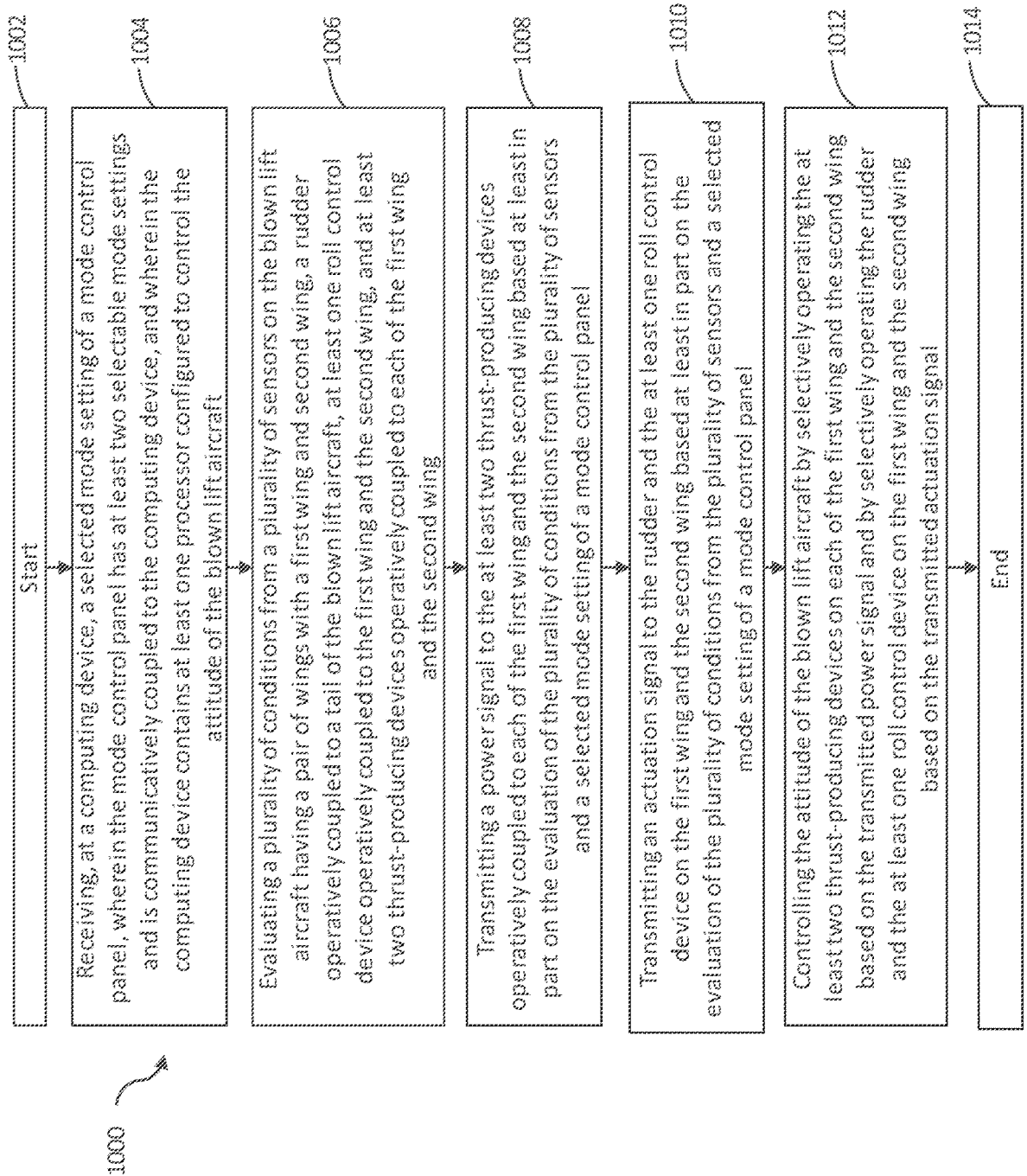
FIG. 10 is a flow chart block diagram for an exemplary method of controlling the attitude of a blown lift aircraft in accordance with some embodiments.

FIG. 10 is a flow chart block diagram for an exemplary method 1000 of controlling the attitude of a blown lift aircraft 100 in accordance with some embodiments. The method 1000 starts at step 1002 and moves to step 1004 where the method 1000 includes receiving, at a computing device 300, a selected mode setting of a mode control panel 210. The mode control panel 210 may have at least two selectable mode settings and may be communicatively coupled to the computing device 300. The computing device 300 may contain at least one processor 302 configured to control the attitude of the blown lift aircraft 100. The method 1000 then moves to step 1006, which may include evaluating a plurality of conditions from a plurality of sensors, such as the sensors that provide inputs to the plurality of modules illustrated in FIG. 2, on the blown lift aircraft 100 having a pair of wings with a first wing 102 and second wing 104, a rudder 116 operatively coupled to a tail 114 of the blown lift aircraft 100. The blown lift aircraft 100 may also include at least one roll control device 112 operatively coupled to the first wing 102 and the second wing 104, and at least two thrust-producing devices operatively 106, 108 coupled to each of the first wing 102 and the second wing 104.

The method 1000 then moves to step 1008, which may include transmitting a power signal to the at least two thrust-producing devices 106, 108 operatively coupled to each of the first wing 102 and the second wing 104 based at least in part on the evaluation of the plurality of conditions from the plurality of sensors, such as the sensors that provide inputs to the modules illustrated in FIG. 2. The evaluation may also include a selected mode setting of a mode control panel 210. The method 1000 then moves to step 1010, which may include transmitting an actuation signal to the rudder 116 and the at least one roll control device 112 on the first wing 102 and the second wing 104 based at least in part on the evaluation of the plurality of conditions from the plurality of sensors, such as the sensors that provide inputs to the modules illustrated in FIG. 2. The evaluation may also include a selected mode setting of a mode control panel 210. The method 1000 then moves to step 1012, which may include controlling the attitude of the blown lift aircraft 100 by selectively operating the at least two thrust-producing devices 106, 108 on each of the first wing 102 and the second wing 104 based on the transmitted power signal. The controlling the attitude of the blown lift aircraft 100 may also include selectively operating the rudder 116 and the at least one roll control device 112 on the first wing 102 and the second wing 104 based on the transmitted actuation signal. The method 1000 then ends at step 1014.

Figure 11:
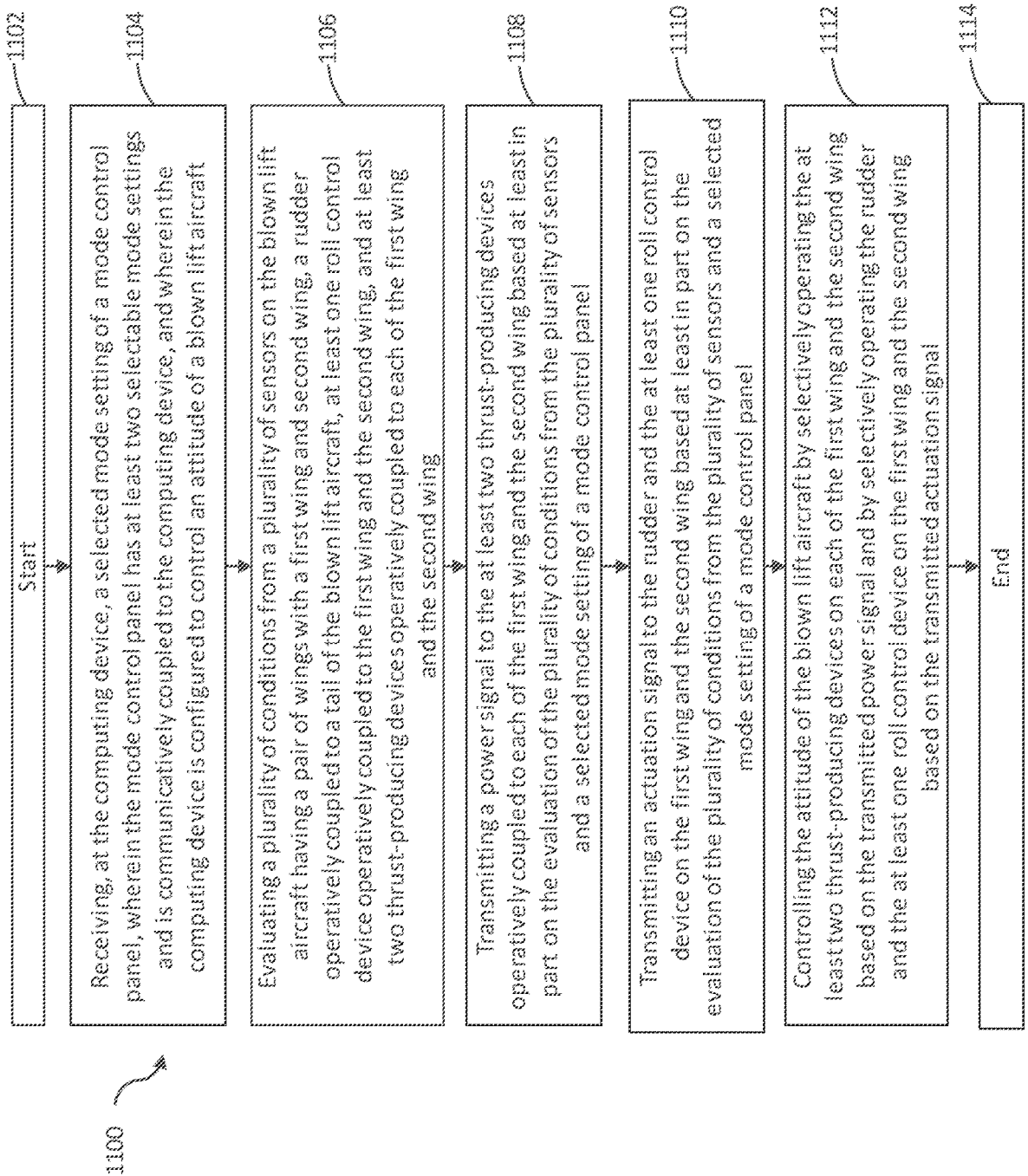
FIG. 11 is a flowchart block diagram depicting an example implementation of a set of instructions to control an aircraft in accordance with some embodiments.

FIG. 11 is a flowchart block diagram depicting an example implementation of a set of instructions 1100 to control an aircraft 100 in accordance with some embodiments. The set of instructions 1100 are stored on a non-transitory computer readable medium, such as instruction memory 310 and/or working memory 312. The set of instructions 1100 are executed by at least one processor 302, and cause the computing device 300 to perform operations corresponding to the set of instructions 1100. The set of instructions 1100 starts with step 1102 and moves to step 1104, where the computing device 300 performs the operation of receiving, at the computing device 300, a selected mode setting of a mode control panel 210. The mode control panel 210 may have at least two selectable mode settings and may be communicatively coupled to the computing device 300. The computing device 300 may be configured to control an attitude of a blown lift aircraft 100.

At step 1106, the computing device 300 performs the operation of evaluating a plurality of conditions from a plurality of sensors, such as the sensors that provide inputs to the modules illustrated in FIG. 2, on the blown lift aircraft 100 having a pair of wings with a first wing 102 and second wing 104. The blown lift aircraft 100 may also have a rudder 116 operatively coupled to a tail 114 of the blown lift aircraft 100, at least one roll control device 112 operatively coupled to the first wing 102 and the second wing 104, and at least two thrust-producing devices 106, 108 operatively coupled to each of the first wing 102 and the second wing 104. The set of instructions 1100 then moves to step 1108, where the computing device 300 performs the operation of transmitting a power signal to the at least two thrust-producing devices 106, 108 operatively coupled to each of the first wing 102 and the second wing 104 based at least in part on the evaluation of the plurality of conditions from the plurality of sensors, such as the sensors that provide inputs to the modules illustrated in FIG. 2. The evaluation may also include a selected mode setting of a mode control panel 210.

The set of instructions 1100 moves on to step 1110, where the computing device 300 performs the operation of transmitting an actuation signal to the rudder 116 and the at least one roll control device 112 on the first wing 102 and the second wing 104 based at least in part on the evaluation of the plurality of conditions from the plurality of sensors, such as the sensors that provide inputs to the modules illustrated in FIG. 2. The evaluation may also include a selected mode setting of a mode control panel 210. At step 1112, the computing device 300 performs the operation of controlling the attitude of the blown lift aircraft 100 by selectively operating the at least two thrust-producing devices 106, 108 on each of the first wing 102 and the second wing 104 based on the transmitted power signal and by selectively operating the rudder 116 and the at least one roll control device 112 on the first wing 102 and the second wing 104 based on the transmitted actuation signal. The set of instructions 1100 then ends at step 1114.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN), a wireless personal area network (WPAN), CAN or ARINC. Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or user) module.

The term machine learned model, as used herein, includes data models created using machine learning. Machine learning, according to the present disclosure, may involve putting a model through supervised or unsupervised training. Machine learning can include models that may be trained to learn relationships between various groups of data. Machine learned models may be based on a set of algorithms that are designed to model abstractions in data by using a number of processing layers. The processing layers may be made up of levels of trainable filters, transformations, projections, hashing, pooling, and regularization. The models may be used in large-scale relationships-recognition tasks. The models can be created by using various open-source and proprietary machine learning tools known to those of ordinary skill in the art.

In some embodiments, a blown lift aircraft may include a tail having a rudder and a pair of wings including a first wing and a second wing. The first wing and the second wing may each include at least one flap and at least one roll control device operatively coupled to the first wing and the second wing. The blown lift aircraft may also include at least two thrust-producing devices operatively coupled to each of the first wing and the second wing. The blown lift aircraft may also include a differential thrust control system having a computing device with at least one processor configured to control an attitude of the blown lift aircraft. The controlling of an attitude of the blown lift aircraft may include selectively operating the at least two thrust-producing devices on each of the first wing and the second wing, the rudder, and the at least one roll control device on the first wing and the second wing based at least in part on a plurality of conditions provided by a plurality of sensors on the blown lift aircraft and a selected mode setting of a mode control panel. The computing device may be communicatively coupled to the at least two thrust-producing devices on the first wing and the second wing, the rudder, and the at least one roll control device on the first wing and the second wing.

In some embodiments, the at least one roll control device on the first wing and the second wing may be an aileron.

In some embodiments, the at least one roll control device on the first wing and the second wing may be a spoiler.

In some embodiments, there may be four thrust-producing devices on each of the first wing and the second wing.

In some embodiments, the four thrust-producing devices on each of the first wing and the second wing may be electric propulsion units.

In some embodiments, the selected mode setting of the mode control panel may correspond to at least one of a rudder augmentation mode, a roll augmentation mode, an automatic compensation of electric propulsion unit failure mode, an adverse yaw compensation mode, and a yaw damping mode.

In some embodiments, the at least one processor of the computing device may be further configured to differentially control the at least two thrust-producing devices on each of the first wing and the second wing based at least in part on the plurality of conditions and the selected mode setting of the mode control panel.

In some embodiments, the plurality of conditions may include inputs from one or more of an air data sensors module, a configuration sensors module, a control module, the mode control panel, and an attitude module.

In some embodiments, the at least one processor of the computing device may be further configured to selectively operate the at least two thrust-producing devices on each of the first wing and the second wing, the rudder, and the at least one roll control device on the first wing and the second wing using at least one of an algorithm, a lookup table, and a machine learned model.

In some embodiments, the at least one processor of the computing device may be further configured to differentially control the at least one roll control device on the first wing and the second wing based at least in part on the plurality of conditions and the selected mode setting of the mode control panel.

In some embodiments, a method of controlling an attitude of a blown lift aircraft may include receiving, at a computing device, a selected mode setting of a mode control panel. The mode control panel may have at least two selectable mode settings and may be communicatively coupled to the computing device. The computing device may contain at least one processor configured to control the attitude of the blown lift aircraft. The method may also include evaluating a plurality of conditions from a plurality of sensors on the blown lift aircraft having a pair of wings with a first wing and second wing, a rudder operatively coupled to a tail of the blown lift aircraft, at least one roll control device operatively coupled to the first wing and the second wing, and at least two thrust-producing devices operatively coupled to each of the first wing and the second wing. The method may also include transmitting a power signal to the at least two thrust-producing devices operatively coupled to each of the first wing and the second wing based at least in part on the evaluation of the plurality of conditions from the plurality of sensors and a selected mode setting of a mode control panel. The method may also include transmitting an actuation signal to the rudder and the at least one roll control device on the first wing and the second wing based at least in part on the evaluation of the plurality of conditions from the plurality of sensors and a selected mode setting of a mode control panel. The method may also include controlling the attitude of the blown lift aircraft by selectively operating the at least two thrust-producing devices on each of the first wing and the second wing based on the transmitted power signal and by selectively operating the rudder and the at least one roll control device on the first wing and the second wing based on the transmitted actuation signal.

In some embodiments, the method may include differentially controlling the at least two thrust-producing devices on each of the first wing and the second wing.

In some embodiments, the method may include differentially controlling the at least one roll control device on the first wing and the second wing.

In some embodiments, the controlling step may be based on the computing device controlling the attitude of the blown lift aircraft based at least in part on at least one of a lookup table, and a machine learned model.

In some embodiments, the at least two thrust-producing devices on each of the first wing and the second wing may be four electric propulsion units.

In some embodiments, there may be at least five setting modes of the mode control panel which comprise at least one of a rudder augmentation mode, a roll augmentation mode, an automatic compensation of electric propulsion unit failure mode, an adverse yaw compensation mode, and a yaw damping mode.

In some embodiments, a non-transitory computer readable medium may have instructions stored thereon. The instructions, when executed by at least one processor, may cause a computing device to perform operations that may include receiving, at the computing device, a selected mode setting of a mode control panel. The mode control panel may have at least two selectable mode settings and may be communicatively coupled to the computing device. The computing device may be configured to control an attitude of a blown lift aircraft. The operations may also include evaluating a plurality of conditions from a plurality of sensors on the blown lift aircraft having a pair of wings with a first wing and second wing, a rudder operatively coupled to a tail of the blown lift aircraft, at least one roll control device operatively coupled to the first wing and the second wing. The blown lift aircraft may also have at least two thrust-producing devices operatively coupled to each of the first wing and the second wing. The operations may also include transmitting a power signal to the at least two thrust-producing devices operatively coupled to each of the first wing and the second wing based at least in part on the evaluation of the plurality of conditions from the plurality of sensors and a selected mode setting of a mode control panel. The operations may also include transmitting an actuation signal to the rudder and the at least one roll control device on the first wing and the second wing based at least in part on the evaluation of the plurality of conditions from the plurality of sensors and a selected mode setting of a mode control panel. The operations may also include controlling the attitude of the blown lift aircraft by selectively operating the at least two thrust-producing devices on each of the first wing and the second wing based on the transmitted power signal and by selectively operating the rudder and the at least one roll control device on the first wing and the second wing based on the transmitted actuation signal.

In some embodiments, the operations may include differentially controlling the at least two thrust-producing devices on each of the first wing and the second wing.

In some embodiments, the operations may include differentially controlling the at least one roll control device on the first wing and the second wing.

In some embodiments, the controlling step may be based on the computing device controlling the attitude of the blown lift aircraft based at least in part on at least one of a lookup table, and a machine learned model.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A differential thrust control system comprising:
at least four thrust-producing devices, wherein the at least four thrust-producing devices are at least two thrust-producing devices operatively coupled to each of a first wing and a second wing of an aircraft and configured to blow over each of the first wing and the second wing, wherein the aircraft further comprises a tail with a rudder, and wherein the first wing and the second wing each include at least one flap and at least one roll control device operatively coupled to the first wing and the second wing; and
a computing device communicatively coupled to the at least two thrust producing devices on each of the first wing and the second wing, the computing device having at least one processor configured to control an attitude of the aircraft by selectively operating the at least two thrust-producing devices on each of the first wing and the second wing based at least in part on a plurality of conditions provided by a plurality of sensors on the aircraft and a selected mode setting of a mode control panel.

2. The differential thrust control system of claim 1, wherein the at least one roll control device on the first wing and the second wing is an aileron.

3. The differential thrust control system of claim 1, wherein the at least one roll control device on the first wing and the second wing is a spoiler.

4. The differential thrust control system of claim 1, wherein there are four thrust-producing devices on each of the first wing and the second wing.

5. The differential thrust control system of claim 4, wherein the at least two thrust-producing devices on each of the first wing and the second wing are electric propulsion units.

6. The differential thrust control system of claim 5, wherein the selected mode setting of the mode control panel corresponds to at least one of a rudder augmentation mode, a roll augmentation mode, an automatic compensation of electric propulsion unit failure mode, an adverse yaw compensation mode, and a yaw damping mode.

7. The differential thrust control system of claim 1, wherein the at least one processor of the computing device is further configured to differentially control the at least two thrust-producing devices on each of the first wing and the second wing based at least in part on the plurality of conditions and the selected mode setting of the mode control panel.

8. The differential thrust control system of claim 1, wherein the plurality of conditions comprise inputs from one or more of an air data sensors module, a configuration sensors module, a control module, the mode control panel, and an attitude module.

9. The differential thrust control system of claim 1, wherein the at least one processor of the computing device is further configured to selectively operate the at least two thrust-producing devices on each of the first wing and the second wing, the rudder, and the at least one roll control device on each of the first wing and the second wing using at least one of an algorithm, a lookup table, and a machine learned model.

10. The differential thrust control system of claim 1, wherein the at least one processor of the computing device is further configured to differentially control the at least one roll control device on the first wing and the second wing based at least in part on the plurality of conditions and the selected mode setting of the mode control panel.

11. A method of controlling an aircraft, comprising:
receiving, at a computing device, a selected mode setting of a mode control panel, wherein the mode control panel has at least two selectable mode settings and is communicatively coupled to the computing device, and wherein the computing device contains at least one processor configured to control an attitude of the aircraft;
evaluating a plurality of conditions from a plurality of sensors on the aircraft, the aircraft having a first wing and a second wing, a rudder operatively coupled to a tail of the aircraft, at least one roll control device operatively coupled to each of the first wing and the second wing, and at least two thrust-producing devices operatively coupled to each of the first wing and the second wing and configured to blow over the first wing and the second wing;
transmitting a power signal to the at least two thrust-producing devices operatively coupled to each of the first wing and the second wing based at least in part on the evaluation of the plurality of conditions from the plurality of sensors and the selected mode setting of the mode control panel; and
controlling the attitude of the aircraft by selectively operating the at least two thrust-producing devices on each of the first wing and the second wing based on the transmitted power signal.

12. The method of claim 11, further comprising differentially controlling the at least two thrust-producing devices on each of the first wing and the second wing.

13. The method of claim 11, further comprising differentially controlling the at least one roll control device on each of the first wing and the second wing.

14. The method of claim 11, wherein the controlling step is based on the computing device controlling the attitude of the aircraft based at least in part on at least one of an algorithm, a lookup table, and a machine learned model.

15. The method of claim 11, wherein the at least two thrust-producing devices on each of the first wing and the second wing are electric propulsion units.

16. The method of claim 11, wherein there are at least five selectable mode settings of the mode control panel which comprise a rudder augmentation mode, a roll augmentation mode, an automatic compensation of electric propulsion unit failure mode, an adverse yaw compensation mode, and a yaw damping mode.

17. A non-transitory computer readable medium having instructions stored thereon, wherein the instructions, when executed by at least one processor, cause a computing device to perform operations comprising:
receiving, at the computing device, a selected mode setting of a mode control panel, wherein the mode control panel has at least two selectable mode settings and is communicatively coupled to the computing device, and wherein the computing device is configured to control an attitude of an aircraft;
evaluating a plurality of conditions from a plurality of sensors on the aircraft having a first wing and a second wing, a rudder operatively coupled to a tail of the aircraft, at least one roll control device operatively coupled to each of the first wing and the second wing, and at least two thrust-producing devices operatively coupled to each of the first wing and the second wing and configured to blow over each of the first wing and the second wing;

transmitting a power signal to the at least two thrust-producing devices operatively coupled to each of the first wing and the second wing based at least in part on the evaluation of the plurality of conditions from the plurality of sensors and the selected mode setting of the mode control panel; and controlling the attitude of the aircraft by selectively operating the at least two thrust-producing devices on each of the first wing and the second wing based on the transmitted power signal.

18. The non-transitory computer readable medium of claim 17, further comprising differentially controlling the at least two thrust-producing devices on each of the first wing and the second wing.

19. The non-transitory computer readable medium of claim 17, further comprising differentially controlling the at least one roll control device on each of the first wing and the second wing.

20. The non-transitory computer readable medium of claim 17, wherein the controlling step is based on the computing device controlling the attitude of the aircraft based at least in part on at least one of an algorithm, a lookup table, and a machine learned model.

\* \* \* \* \*